(12) United States Patent
Shmilovich et al.

(10) Patent No.: US 7,798,423 B1
(45) Date of Patent: Sep. 21, 2010

(54) INTEGRATED ENGINE EXHAUST SYSTEMS AND METHODS FOR DRAG AND THERMAL STRESS REDUCTION

(75) Inventors: Arvin Shmilovich, Hungtington Beach, CA (US); Yoram Yadlin, Irvine, CA (US); David M. Smith, Santa Ana, CA (US); Roger W. Clark, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 19 days.

(21) Appl. No.: 12/686,639

(22) Filed: Jan. 13, 2010

Related U.S. Application Data

(62) Division of application No. 11/379,971, filed on Apr. 24, 2006, now Pat. No. 7,669,785.

(51) Int. Cl.
  *B63H 11/10* (2006.01)
(52) U.S. Cl. .............................. 239/265.19; 239/265.43; 244/73 R; 60/771
(58) Field of Classification Search ............... 244/73 R, 244/55, 130, 129.1; 60/770, 771, 226.1; 239/265.11, 265.19, 265.27, 265.25, 265.43
See application file for complete search history.

(56) References Cited

U.S. PATENT DOCUMENTS

| | | | |
|---|---|---|---|
| 2,658,333 | A | 11/1953 | Smialowski |
| 3,007,304 | A | 11/1961 | Wotton |
| 3,442,471 | A | 5/1969 | Fischer et al. |
| 3,971,534 | A | 7/1976 | Grotz |
| 4,000,610 | A | 1/1977 | Nash et al. |
| 4,000,611 | A | 1/1977 | McCardle, Jr. et al. |
| 4,068,469 | A | 1/1978 | Adamson |
| 5,653,406 | A | 8/1997 | Amano et al. |
| 6,082,635 | A | 7/2000 | Seiner et al. |

(Continued)

FOREIGN PATENT DOCUMENTS

EP   1367249 A1   12/2003

(Continued)

OTHER PUBLICATIONS

Decher et al, "Systems Aspects of Engine Installation," The Aerothermodynamics of Aircraft Gas Turbine Engines, Jul. 1978, pp. 26-1 to 26-4 and 26-38 to 26-74.

*Primary Examiner*—Benjamin P Lee
(74) *Attorney, Agent, or Firm*—Lee & Hayes, PLLC

(57) ABSTRACT

Integrated engine exhaust systems and techniques for operating integrated engine exhaust systems are disclosed. In one embodiment, a propulsion system includes an engine installation configured to be mounted on a wing assembly of an aircraft. The engine installation includes an engine, and an exhaust system operatively coupled to the engine. The exhaust system includes at least one nozzle to exhaust an exhaust flow from the engine. The nozzle includes a variable portion configured to vary an exit aperture of the nozzle from a first shape to a second shape to change a flowfield shape of at least a portion of the nozzle flowfield proximate the wing assembly, thereby reducing at least one of drag and thermal loading on the wing assembly. In a further embodiment, the exhaust system includes an inner nozzle that exhausts a core exhaust flow, and an outer nozzle that exhausts a secondary exhaust flow, the outer nozzle having the variable portion configured to vary the exit aperture of the outer nozzle.

20 Claims, 6 Drawing Sheets

U.S. PATENT DOCUMENTS

| | | |
|---|---|---|
| 6,360,528 B1 | 3/2002 | Brausch et al. |
| 6,532,729 B2 | 3/2003 | Martens |
| 6,705,547 B2 | 3/2004 | Braga Da Costa Campos |
| 6,718,752 B2 | 4/2004 | Nesbitt et al. |
| 6,981,365 B1 * | 1/2006 | Johnson ........................ 60/247 |
| 7,004,047 B2 | 2/2006 | Rey et al. |
| 7,093,423 B2 | 8/2006 | Gowda et al. |
| 7,178,338 B2 | 2/2007 | Whurr |
| 7,216,831 B2 | 5/2007 | Wood |
| 7,340,883 B2 | 3/2008 | Wood et al. |
| 7,458,221 B1 | 12/2008 | Arnold et al. |
| 2002/0125340 A1 | 9/2002 | Birch et al. |
| 2003/0231777 A1 | 12/2003 | Butler et al. |
| 2004/0237534 A1 | 12/2004 | Webster et al. |
| 2005/0150223 A1 | 7/2005 | Rey et al. |
| 2005/0229585 A1 | 10/2005 | Webster |

FOREIGN PATENT DOCUMENTS

EP 1482159 A2 12/2004

* cited by examiner

INTEGRATED ENGINE EXHAUST SYSTEMS AND METHODS FOR DRAG AND THERMAL STRESS REDUCTION

This patent application is a divisional application of co-pending, commonly-owned U.S. patent application Ser. No. 11/379,971 entitled "Integrated Engine Exhaust Systems and Methods for Drag and Thermal Stress Reduction" filed Apr. 24, 2006, which application is incorporated herein by reference.

TECHNICAL FIELD

The present disclosure relates to aircraft propulsion systems, and more specifically, to integrated engine exhaust systems and methods for providing reduced drag and/or thermal stress reduction for an aircraft.

BACKGROUND

Many types of aircraft, including transport aircraft, are equipped with wing-mounted turbofan engines. In this configuration, the exhaust flow from the wing-mounted engines may impinge upon the wing surfaces. Some conventional aircraft may utilize the exhaust flow to augment wing lift during low-speed operations, enabling short field take off and landing capabilities for such aircraft.

Although desirable results have been achieved using existing wing-mounted turbofan engines, there is room for improvement. For example, reduced drag will enable aircraft operation from even shorter airfields. In addition, due to the impingement of the high temperature exhaust on the flap and wing surfaces of some aircraft configurations, these surfaces must be designed to withstand extreme thermal loads. Titanium flaps may be required rather than aluminum flaps to withstand the harsh thermal environment. Generally, these design considerations add weight to the aircraft and increase manufacturing costs. Novel systems that mitigate the weight and cost penalties associated with wing-mounted engines would therefore have utility.

SUMMARY

Integrated engine exhaust systems and techniques of operating integrated engine exhaust systems are disclosed. In some embodiments, methods for providing lower drag and thermal stress of an aircraft may advantageously reduce take off and landing distances, reduce aircraft weight, reduce fuel consumption, reduce production and maintenance costs, and reduce noise levels.

In one embodiment, a propulsion system for an aircraft includes an engine installation configured to be mounted on a wing assembly of the aircraft. The engine installation includes an engine, and an exhaust system operatively coupled to the engine. The exhaust system includes at least one nozzle configured to exhaust an exhaust flow from the engine. The nozzle includes a variable portion configured to vary an exit aperture of the nozzle from a first shape to a second shape to change the flowfield shape of at least a portion of the exhaust flowfield proximate the wing assembly to reduce at least one of drag and thermal loading on the wing assembly. In a further embodiment, the exhaust system includes an inner nozzle that exhausts a core exhaust flow, and an outer nozzle that exhausts a secondary exhaust flow, the outer nozzle having the variable portion configured to vary the exit aperture of the outer nozzle.

BRIEF DESCRIPTION OF THE DRAWINGS

The detailed description is described with reference to the accompanying Figures. The same reference numbers in different Figures indicate similar or identical items.

DETAILED DESCRIPTION

Techniques for operating integrated engine exhaust systems may advantageously lower drag and thermal stress on an aircraft. Many specific details of certain embodiments are set forth in the following description and in FIGS. 1-12 to provide a thorough understanding of such embodiments. The present disclosure, however, may have additional embodiments, or may be practiced without one or more of the details described below. Although the methods described herein are illustrated using an aircraft in exemplary embodiments, it should be appreciated that the techniques described herein may be applied to a variety of vehicles such as automobiles, maritime vessels, helicopters, spacecraft, trains, etc.

Techniques of operating integrated engine exhaust systems may advantageously reduce aerodynamic drag, weight, and production and maintenance costs of aircraft having coupled propulsion and high-lift (or powered-lift) systems. In general, embodiments of the integrated engine exhaust system described herein utilizes a variable shape fan exhaust nozzle to control exhaust flow field shape during operation. The resulting exhaust flowfield (including one or both of an outer flowfield and an inner flowfield) affects the wing spanload, resulting in less induced drag and reduced thermal stresses on the wing assembly.

Figure 1:
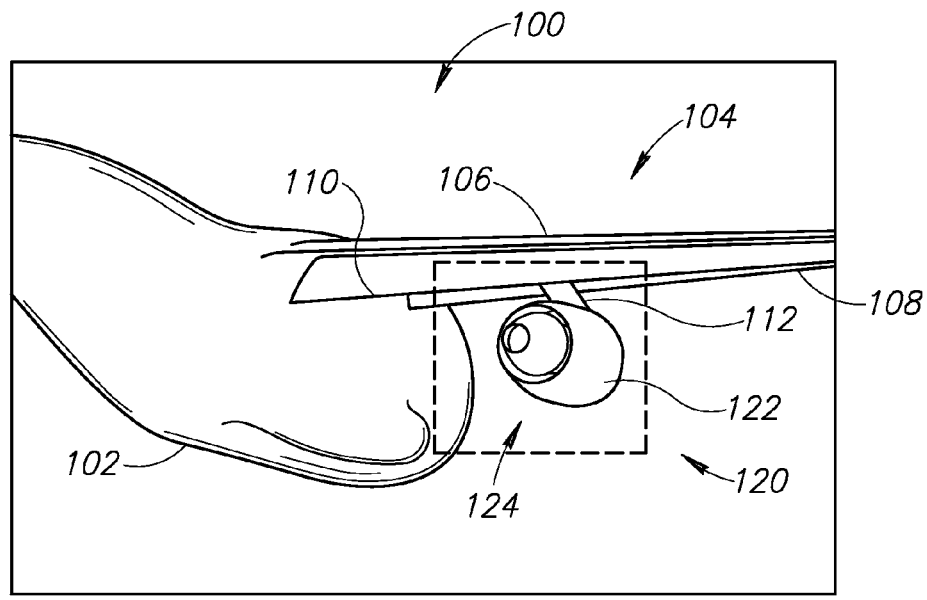
FIG. 1 is a partial isometric view of an aircraft in accordance with an illustrative embodiment of the disclosure.

FIG. 1 is a partial isometric view of an aircraft 100 in accordance with an illustrative embodiment of the disclosure. The aircraft 100 includes a fuselage 102 and a wing assembly 104 that includes a main wing portion 106. A slat portion 108 extends along a leading edge of the main wing portion 106, and a flap portion 110 extends along a trailing edge of the main wing portion 106.

The aircraft 100 further includes an engine installation 120 coupled to the wing assembly 104 by a pylori 112. The engine installation 120 includes an engine nacelle 122, and an exhaust system 124 situated at a downstream (or aft) end portion of the engine installation 120. Any suitable turbofan engines may be employed, including, for example, those engines manufactured by General Electric of Fairfield, Conn., Pratt & Whitney of East Hartford, Conn., and Rolls-Royce of London, U.K.

Figures 2, 3:
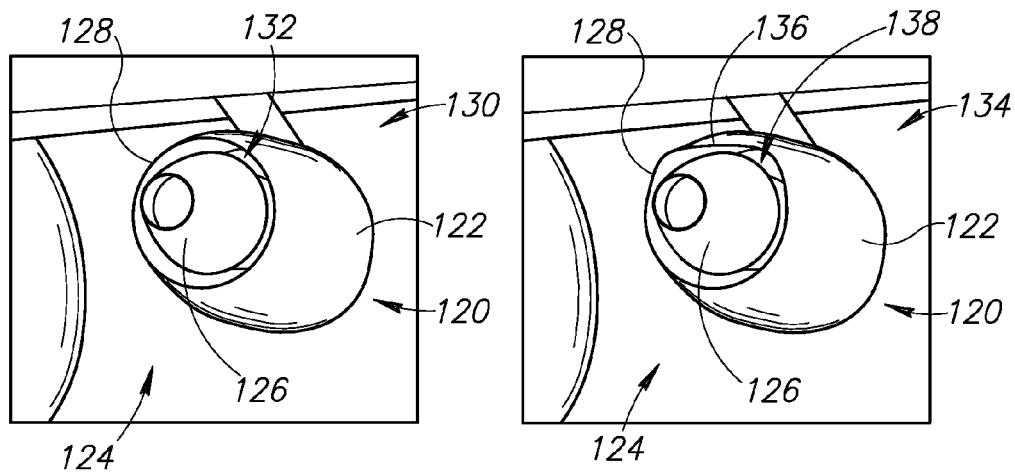
FIG. 2 is an enlarged isometric view of an exhaust system of the aircraft of FIG. 1 operating in a conventional mode of operation.
FIG. 3 is an enlarged isometric view of an exhaust system of the aircraft of FIG. 1 operating in a representative non-conventional mode of operation in accordance with an illustrative embodiment of the disclosure.

FIG. 2 is an enlarged isometric view of the exhaust system 124 of FIG. 1. The exhaust system 124 includes an inner nozzle 126 configured to exhaust a core exhaust flow from a combustor portion of the engine installation 120, and an outer nozzle 128 disposed about the inner nozzle 126 and located proximate a trailing edge portion of the engine nacelle 122. As illustrated in FIG. 2, the inner nozzle 126 may be elongated in comparison with the outer nozzle 128. The outer nozzle 128 is configured to exhaust a relatively-cooler fan flow passing through the engine installation 120. This type of nozzle is referred to as a separate flow nozzle.

In an alternative embodiment of the exhaust system 124, the outer nozzle 128 may be an outer fan nozzle and the inner nozzle 126 may be a short core nozzle buried inside of the outer fan nozzle. This type of alternative nozzle is referred to as a mixed flow nozzle.

With continued reference to FIG. 1, the outer nozzle 128 may adjusted controllably to provide changes in the shape of its exit aperture. For example, as shown in FIG. 2, in a conventional mode of operation 130, the outer nozzle 128 has a circular-shaped exit aperture. In cooperation with the outer surface of the inner nozzle 126, the outer nozzle 128 forms an annular-shaped nozzle exit 132 for exhausting the fan flow in the conventional mode of operation 130.

In some embodiments, the shape of the exit aperture of the outer nozzle 128 may be adjusted to a non-circular shape. FIG. 3 shows the exhaust system 120 in a non-conventional mode of operation 134. In this embodiment, the exit aperture of the outer nozzle 128 includes a flattened upper portion 136, while the remainder of the exit aperture is modified such that the exit area is the same as the exit area of the conventional nozzle. Keeping the area of the exit aperture of the non-conventional nozzle the same as that of the conventional engine ensures similar engine thrust levels and maintain engine cycle compatibility. Thus, the inner and outer nozzles 126, 128 cooperatively form a non-annular nozzle exit 138 for exhausting the fan flow in the non-conventional mode of operation 134. In one particular embodiment, for example, in the non-conventional mode of operation 134, a separation distance between the inner nozzle 126 and the flattened upper portion 136 of the outer nozzle 128 is reduced to one-half (50%) of the corresponding separation distance between the inner and outer nozzles 126, 128 in the conventional mode of operation 130.

The outer nozzle 128 may employ a variety of mechanisms to achieve the desired variation in shape of the exit aperture. For example, in one embodiment, the outer nozzle 128 includes a plurality of flaps which collectively form the exit aperture. The flaps may be controllably adjusted by a set of actuators that enable the exit aperture of the outer nozzle 128 to be adjusted to a non-circular shape. The plurality of flaps may be controllably actuated by any known means, including hydraulic, electric, or shape-memory-alloy (SMA) actuation. More specifically, the plurality of flaps and associated actuation systems of the outer nozzle 128 may include, for example, any of those systems and methods generally disclosed in U.S. Pat. No. 7,004,047 B2 issued to Rey et al., U.S. Pat. No. 5,893,518 issued to Bruchez et al., U.S. Pat. No. 5,245,823 issued to Barcza, U.S. Pat. No. 4,994,660 issued to Hauer, U.S. Pat. No. 4,245,787 issued to Freid, U.S. Pat. No. 4,000,610 issued to Nash et al., and in published U.S. patent application Ser. No. 11/014,232 by Webster, and U.S. patent application Ser. No. 11/049,920 by Rey et al.

Figure 4:
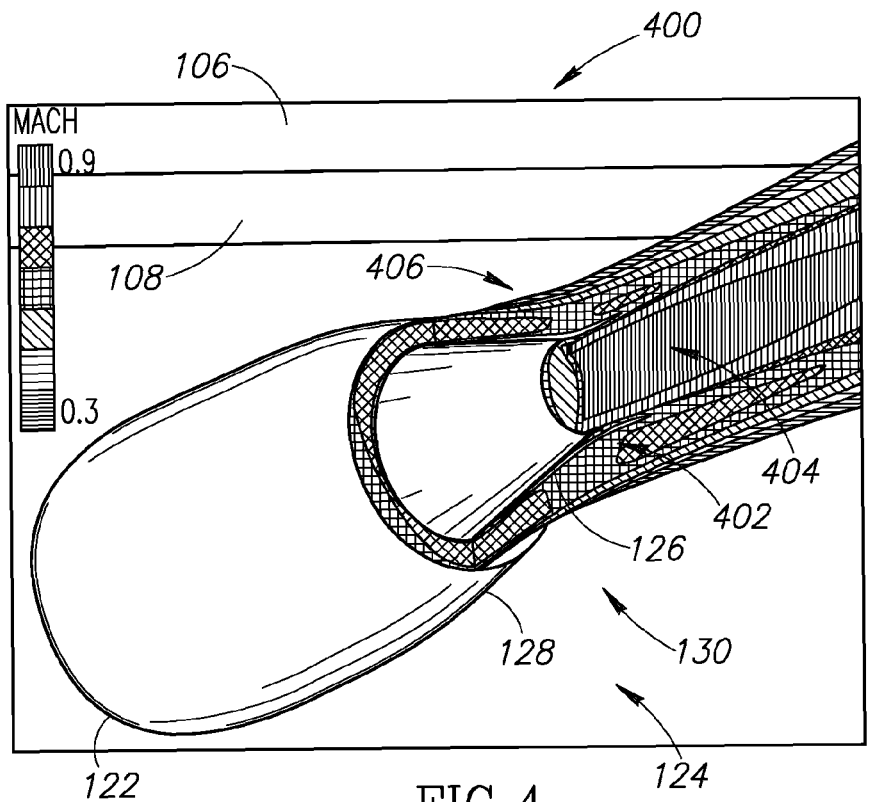
FIG. 4 is an isometric view of the exhaust system operating in the conventional mode of operation as shown in FIG. 2 including a cutaway view of an exhaust flowfield.

FIG. 4 is an isometric view of the exhaust system 124 operating in the conventional mode of operation 130 (FIG. 2), including a cutaway view of an exhaust flowfield 400. In the conventional mode of operation 130, the exit aperture of the outer nozzle 128 is circular, and the exhaust flowfield 400 is generally axisymmetric. An annularly-shaped fan flow 402 emanates from the outer nozzle 128 and is disposed about a central, approximately axisymmetric core flow 404 that emanates from the inner nozzle 126.

Figure 5:
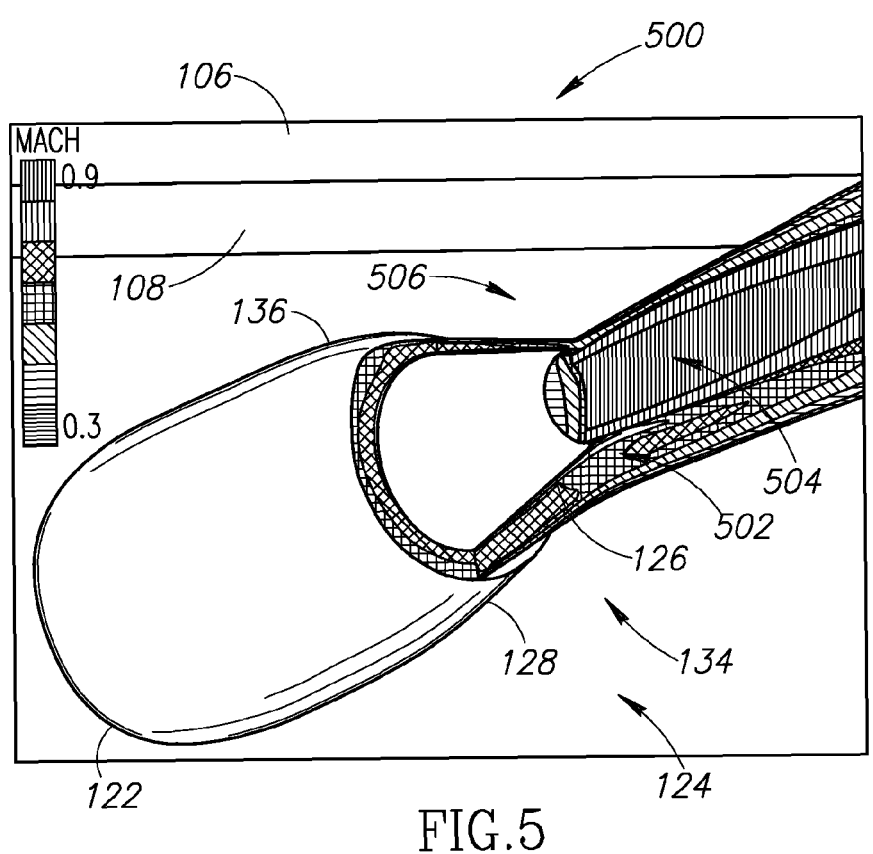
FIG. 5 is an isometric view of the exhaust system operating in the non-conventional mode of operation as shown in FIG. 3 including a cutaway view of the exhaust flowfield.

For comparison, FIG. 5 is an isometric view of the exhaust system 124 operating in the non-conventional mode of operation 134 (FIG. 3), including a cutaway view of an exhaust flowfield 500. In the non-conventional mode of operation 134, the exit aperture of the outer nozzle 128 is non-circular and includes the flattened upper portion 136. Consequently, the exhaust flowfield 500 is non-axisymmetric with a non-annular fan flow 502 emanating from the outer nozzle 128 and disposed about an approximately axisymmetric core flow 504 emanating from the inner nozzle 126. As shown in FIG. 5, an upper portion 506 of the non-conventional exhaust flowfield 500 is varied in shape and less concentrated than a comparable upper portion 406 of the axisymmetric, conventional exhaust flowfield 400 shown in FIG. 4.

Figure 6:
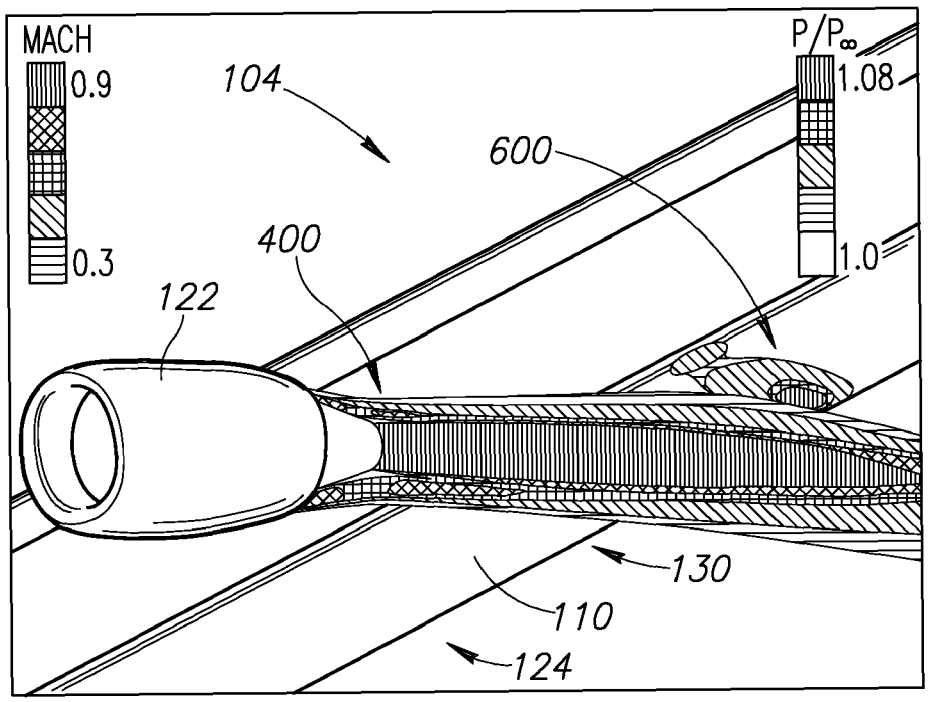
FIG. 6 is an isometric view of the exhaust flowfield of FIG. 4 and an impingement pattern on a wing assembly for the exhaust system operating in the conventional mode of operation.
Figure 7:
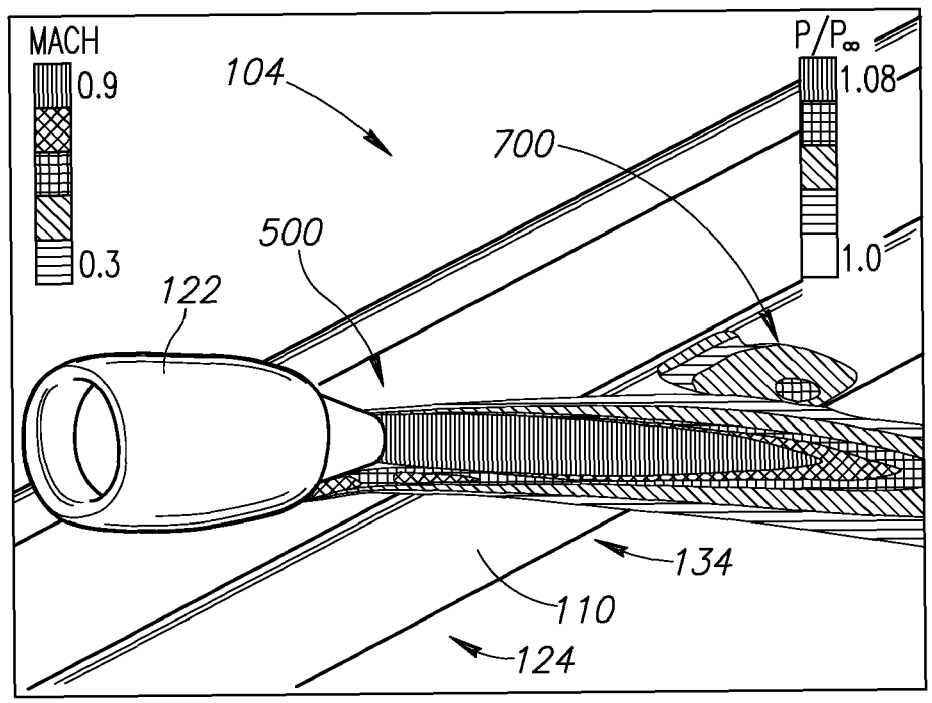
FIG. 7 is an isometric view of the exhaust flowfield of FIG. 5 and an impingement pattern on the wing assembly for the exhaust system operating in the representative non-conventional mode of operation.

FIG. 6 is an isometric view of the exhaust flowfield (shown by Mach number) 400 of FIG. 4, and a pressure distribution 600 on the wing assembly 104, for the exhaust system 124 operating in the conventional mode of operation 130 (FIG. 2). Similarly, FIG. 7 is an isometric view of the exhaust flowfield (shown by Mach number) 500 (FIG. 5) and pressure distribution 700 for the exhaust system 124 operating in the non-conventional mode of operation 134 (FIG. 3). Comparison of the pressure distributions 600, 700 shown in FIGS. 6 and 7 shows that in the non-conventional mode of operation 134, the exhaust flowfield 500 results in a more uniform pressure distribution on the flap portion 110 of the wing assembly 104 in comparison with the conventional exhaust flowfield 400. More specifically, in this embodiment, the pressure distribution 600 for the conventional mode of operation 130 (FIG. 6) is marked by a relatively concentrated pressure pattern having a central, relatively-higher peak pressure value (shown as a central dark region). On the other hand, the pressure distribution 700 for the non-conventional mode of operation 134 exhibits a relatively less-concentrated pressure pattern with a relatively-lower peak pressure value (shown as a central, relatively-lighter region). Consequently, there is a smoother spanload distribution and a reduction in induced drag on the wing assembly 104 in the non-conventional mode of operation 134.

Figure 8:
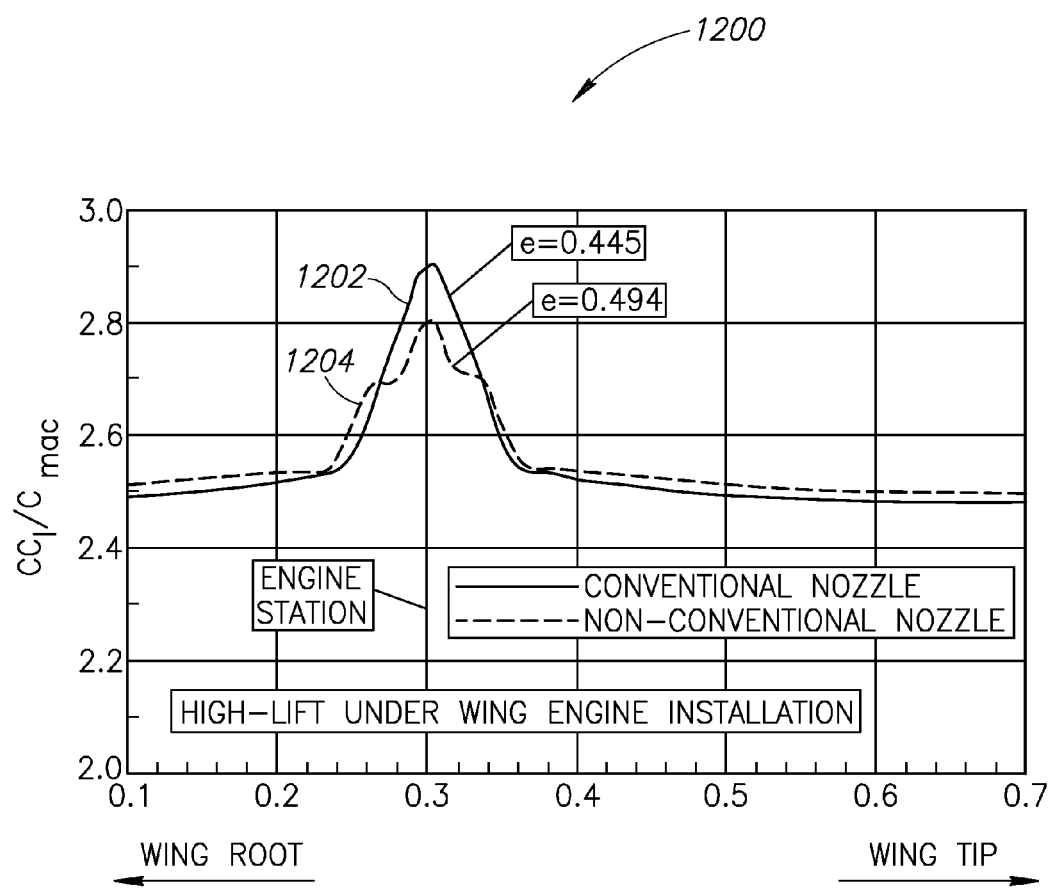
FIG. 8 shows the effect of engine exhaust on span load distribution in accordance with an illustrative embodiment of the disclosure.

FIG. 8 shows the effect of variation of the shape of the engine exhaust on span load distribution in accordance with an illustrative embodiment of the disclosure. More specifically, FIG. 8 shows a graph 1200 of sectional lift versus spanwise position along the wing. A first lift distribution 1202 shows predicted drag data (in terms of the Oswald efficiency factor "e") for the exhaust system 124 operating in the conventional mode of operation 130 (FIG. 2), and a second load distribution 1204 shows predicted drag data for the exhaust system 124 operating in the non-conventional mode of operation 134 (FIG. 3). As shown in FIG. 8, the non-conventional mode of operation 134 provides a more favorable load distribution than the conventional mode of operation 130 due to its relatively less-concentrated pressure pattern with a relatively-lower peak pressure value. For a twin engine aircraft, the predicted aerodynamic efficiency due to the variable fan exhaust increases by about 10% relative to the conventional axisymmetric configuration. This efficiency is proportionately related to the induced component of the drag. Thus, a significant reduction in total drag may be realized since the induced drag is the largest component of airplane drag, including during high lift conditions. Proportionately larger gains in aerodynamic efficiency may be realized from a four-engine aircraft. Reduced total drag translates to reduced required engine power, and hence, it leads to shorter take off distance.

Figure 9:
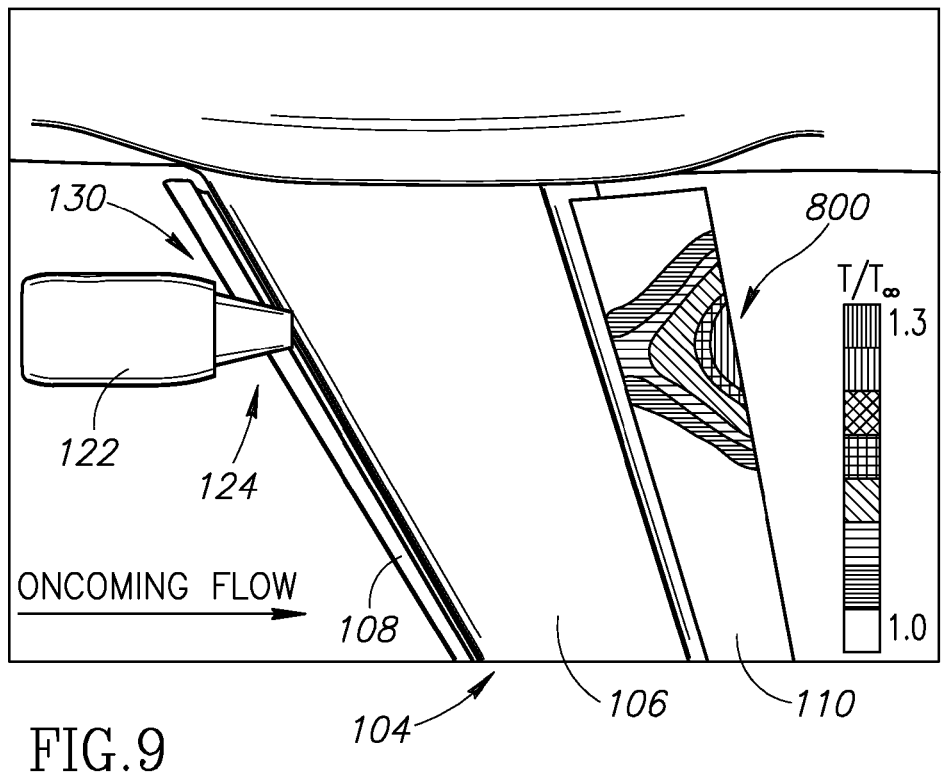
FIG. 9 is a lower elevational view of a wing temperature distribution of the exhaust system operating in the conventional mode of operation as shown in FIG. 2.
Figure 10:
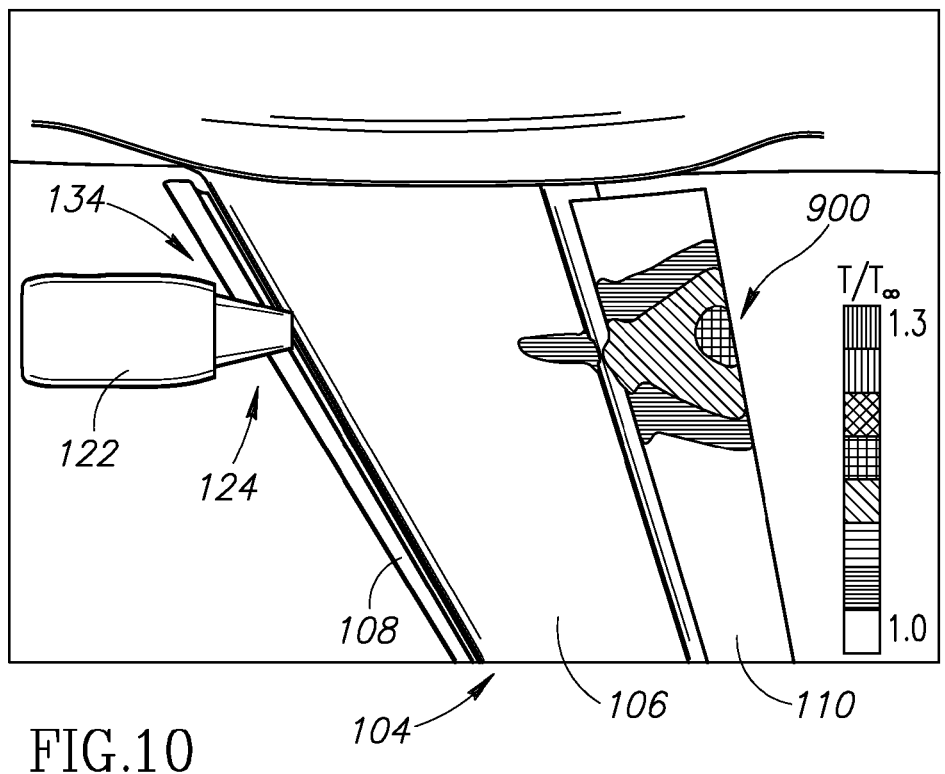
FIG. 10 is a lower elevational view of a wing temperature distribution of the exhaust system operating in the non-conventional mode of operation as shown in FIG. 3.

FIGS. 9 and 10 show wing temperature distributions 800, 900 for the exhaust system 124 operating in conventional and non-conventional modes of operation 130, 134, respectively. Comparison of the wing temperature distributions 800, 900 shown in FIGS. 9 and 10 shows that in the non-conventional mode of operation 134, the exhaust flowfield 500 results in lower temperatures on the flap portion 110 of the wing in comparison with the conventional exhaust flowfield 400. More specifically, in this embodiment, the temperature distribution 800 for the conventional mode of operation 130 (FIG. 9) exhibits a relatively concentrated temperature pattern having a central, relatively-higher peak temperature value (shown as a central dark region). On the other hand, the temperature distribution 900 for the non-conventional mode of operation 134 exhibits a relatively less-concentrated temperature pattern with a relatively-lower peak temperature value (shown as a central, relatively-lighter region). Consequently, there is less thermal load on the wing assembly 104 in the non-conventional mode of operation 134.

Embodiments of the disclosure may provide significant advantages over the prior art. By exploiting the interaction of the non-circular fan exhaust with the surrounding flow passing over the engine nacelle and with the engine core exhaust, embodiments of the disclosure alter the turbulent mixing of the exhaust flow such that the nozzle flowfield interaction with the wing and flap surfaces results in smoother pressure increment and reduced temperature in comparison with the conventional flowfield impingement. Thus, embodiments of the disclosure may be used to tune wingspan load distributions, reduce induced drag, enhance jet mixing, and accelerate temperature decay.

The economical and operational impacts of the drag reduction afforded by the disclosure may be substantial, and may allow the use of smaller engines or shorter runways. Reduced engine size may, in turn, lead to reduced aircraft weight, reduced fuel consumption, reduced maintenance costs and reduced noise levels. Similarly, the reduction in structural temperature limits may allow the use of aluminum flaps rather than titanium flaps, which leads to reduced production costs and reduced aircraft weight.

It will be appreciated that a variety of alternate embodiments may be conceived. In the following discussion of alternate embodiments, components which remain unchanged from the previously described embodiments are designated with like reference numerals. For the sake of brevity, only substantial structural and operational differences from the previously-discussed embodiments will be described.

Figure 11:
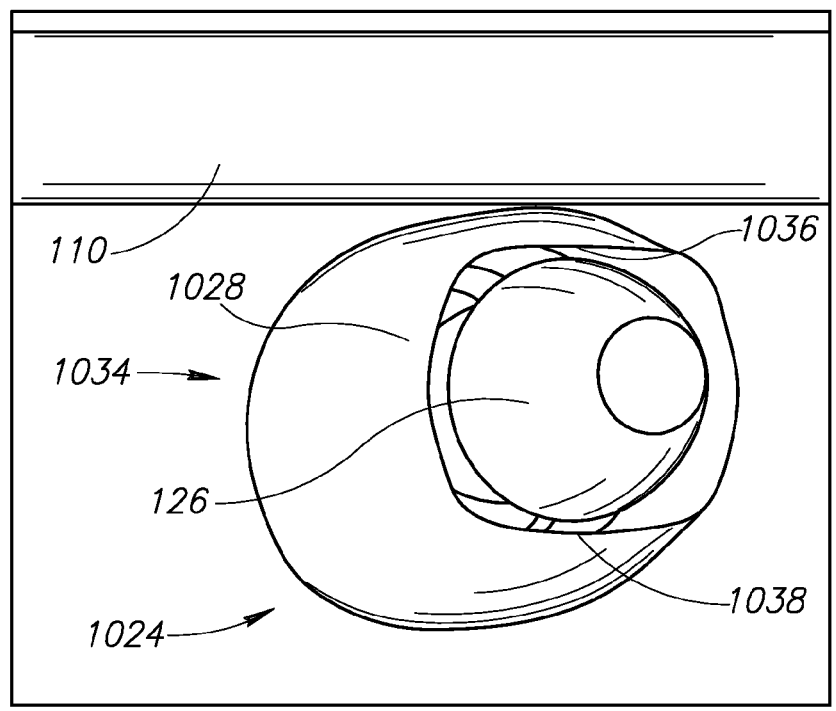
FIGS. 11 and 12 are isometric views of aircraft exhaust systems in accordance with alternate embodiments of the disclosure.

FIG. 11 shows an isometric view of an aircraft exhaust system 1024 in accordance with an alternate embodiment of the disclosure. In this embodiment, in a non-conventional operating mode 1034, an outer nozzle 1028 of the exhaust system 1024 includes both a flattened upper portion 1036 and a flattened lower portion 1038. The resulting exit aperture of the outer nozzle 1028 is a non-circular shape disposed about the axisymmetric inner nozzle 126. Consequently, the resulting non-conventional exhaust flowfield (not shown) is varied in shape proximate to the wing assembly, and less concentrated (e.g. having relatively-lower peak pressure and temperature values at the surfaces of the wing assembly 104) than the comparable upper portion 406 of the axisymmetric, conventional exhaust flowfield 400 shown in FIG. 4.

Figure 12:
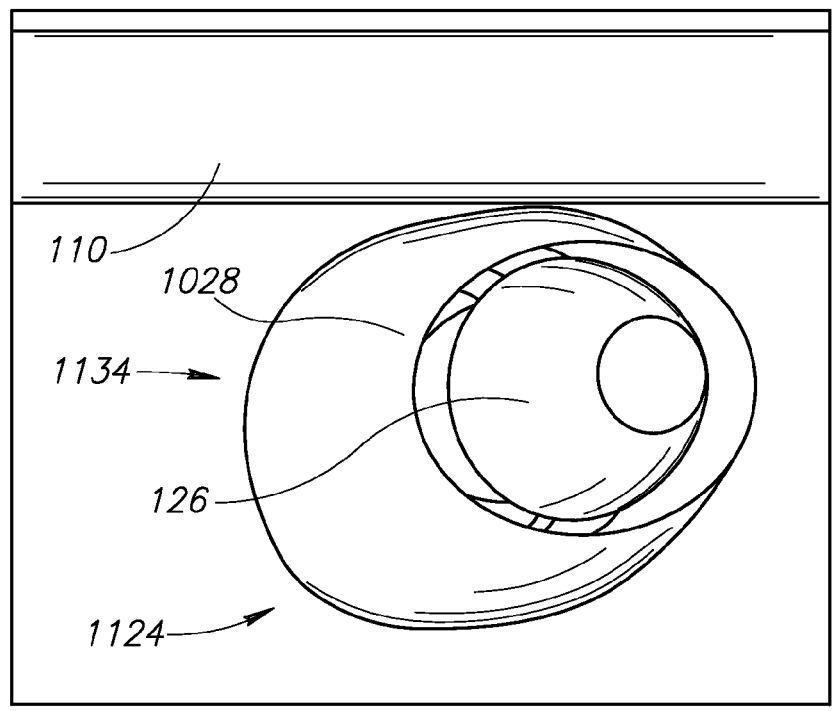

Similarly, FIG. 12 shows an isometric view of an aircraft exhaust system 1124 in accordance with another alternate embodiment of the disclosure. In a non-conventional operating mode 1134, an outer nozzle 1128 of the exhaust system 1124 is controllably positioned into an approximately elliptical shape with a vertical minor axis. Again, the resulting non-conventional exhaust flowfield (not shown) is varied in shape and less concentrated (e.g. having relatively-lower peak pressure and temperature values at the surfaces of the wing assembly 104) than the comparable upper portion 406 of the axisymmetric, conventional exhaust flowfield 400 shown in FIG. 4. Thus, the advantages of reduced drag and reduced thermal loads, as described more fully above, may be achieved using a variety of alternate exhaust system embodiments.

CONCLUSION

While embodiments of the disclosure have been illustrated and described, as noted above, many changes can be made without departing from the spirit and scope of the disclosure. Accordingly, the scope of the disclosure is not limited by the disclosure of these embodiments. Instead, the disclosure should be determined entirely by reference to the claims that follow.

What is claimed is:

1. A method of operating an engine exhaust system of an aircraft, the method comprising:
   providing an engine installation on a wing assembly of the aircraft, the engine installation including an exhaust system having at least one nozzle configured to exhaust an exhaust flow;
   operating an engine of the engine installation to provide a nozzle flowfield including the exhaust flow emanating from the at least one nozzle; and
   controllably varying an exit aperture shape of at least a portion of the at least one nozzle from a first shape to a second shape to change a flowfield shape of at least a portion of the nozzle flowfield, the first shape and the second shape having substantially equal exit areas.

2. The method of claim 1, wherein controllably varying the exit aperture shape of at least a portion of the at least one nozzle includes adjusting a plurality of flaps via a plurality of actuators.

3. The method of claim 1, wherein controllably varying the exit aperture shape of at least a portion of the at least one nozzle includes flattening an upper portion of the at least one nozzle.

4. The method of claim 1, wherein controllably varying the exit aperture shape of at least a portion of the at least one nozzle includes flattening an upper portion of the at least one nozzle and flattening a lower portion of the at least one nozzle.

5. The method of claim 1, wherein controllably varying the exit aperture shape of at least a portion of the at least one nozzle includes controllably varying the exit aperture shape of at least a portion of the at least one nozzle to an approximately elliptical exit aperture.

6. The method of claim 1, wherein controllably varying the exit aperture shape of at least a portion of the at least one nozzle reduces at least one of drag and thermal loading on the wing assembly.

7. A method of controlling a flowfield from an aircraft engine, the method comprising:
providing an engine installation on a wing assembly of the aircraft, the engine installation including an exhaust system having an inner nozzle and an outer nozzle disposed about the inner nozzle, the exhaust system to emanate an exhaust flow;
operating an engine of the engine installation to provide a nozzle flowfield including the exhaust flow emanating from the exhaust system; and
varying an exit aperture shape of the outer nozzle from a first shape to a second shape to change a flowfield shape of at least a portion of the nozzle flowfield, an exit area of the first shape substantially equal to an exit area of the second shape.

8. The method of claim 7, wherein a length of the inner nozzle is longer than a length of the outer nozzle.

9. The method of claim 7, wherein a length of the out nozzle is longer than a length of the inner nozzle.

10. The method of claim 7, wherein varying the exit aperture shape of the outer nozzle includes controllably adjusting a plurality of flaps via a plurality of actuators, the plurality of flaps coupled to the outer nozzle.

11. The method of claim 7, wherein varying the exit aperture shape of the outer nozzle includes flattening an upper portion of the outer nozzle.

12. The method of claim 11, wherein the inner nozzle and the outer nozzle form a non-annular nozzle exit.

13. The method of claim 7, wherein varying the exit aperture shape of the outer nozzle includes flattening an upper portion of the outer nozzle and flattening a lower portion of the outer nozzle.

14. The method of claim 13, wherein the inner nozzle and the outer nozzle form a non-annular nozzle exit shape.

15. The method of claim 7, wherein the second shape is approximately elliptically shaped.

16. The method of claim 7, wherein operating the engine of the engine installation includes operating a turbofan engine to emanate a core exhaust flow from the inner nozzle and further to emanate a fan exhaust flow from the outer nozzle.

17. A method of controlling exhaust airflow, the method comprising:
providing an exhaust system to emanate a nozzle flowfield from an engine, the exhaust system including an inner nozzle and an outer nozzle disposed about the inner nozzle, the inner nozzle having an axisymmetric exit aperture; and
varying an exit aperture shape of the outer nozzle from a first shape to a second shape to change a shape of at least a portion of the nozzle flowfield, an exit area of the first shape substantially equal to an exit area of the second shape.

18. The method of claim 17, wherein varying the exit aperture shape of the outer nozzle includes flattening an upper portion of the outer nozzle.

19. The method of claim 17, wherein varying the exit aperture shape of the outer nozzle includes flattening an upper portion of the outer nozzle and flattening a lower portion of the outer nozzle.

20. The method of claim 17, wherein varying the exit aperture shape of the outer nozzle includes controllably adjusting a plurality of flaps via a plurality of actuators coupled to the outer nozzle.

* * * * *